March 20, 1962 J. H. STALL 3,025,782
BARBECUING VEHICLE
Filed Feb. 9, 1959 3 Sheets-Sheet 1
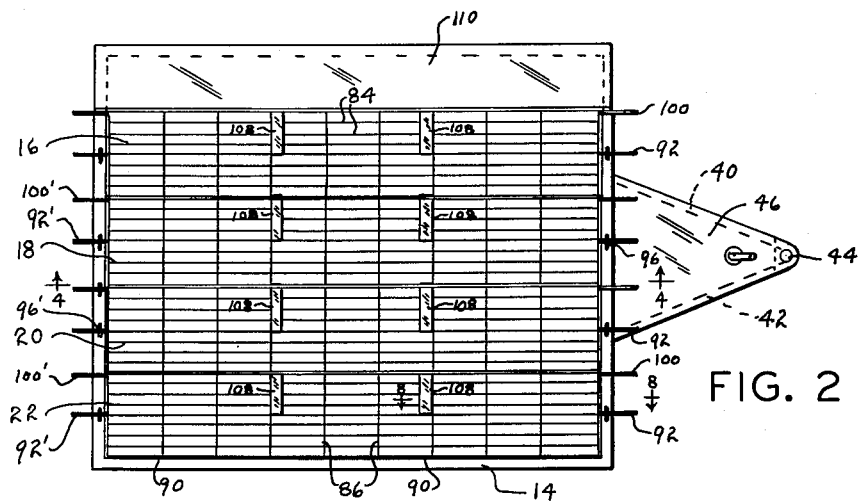
FIG. 2
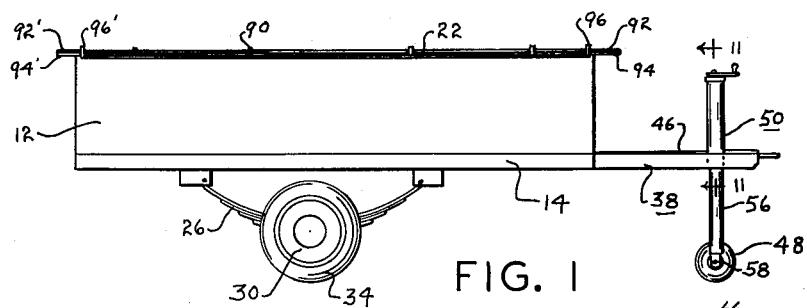
FIG. 1
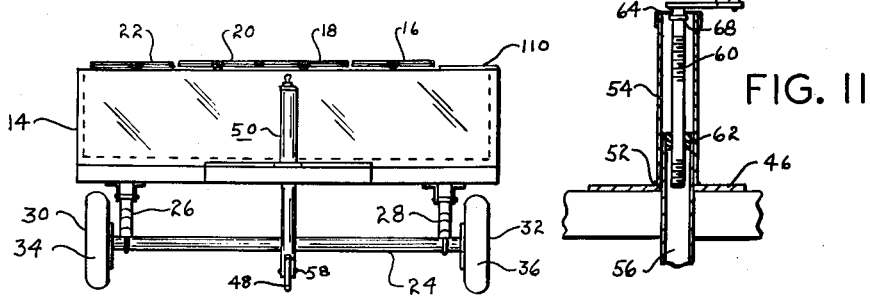
FIG. 11
FIG. 3
INVENTOR.
JAMES H. STALL
BY M. A. Hobbs
ATTORNEY March 20, 1962 — J. H. STALL — 3,025,782
BARBECUING VEHICLE
Filed Feb. 9, 1959 — 3 Sheets-Sheet 2

INVENTOR.
JAMES H. STALL
BY M. A. Hobbs
ATTORNEY

March 20, 1962 J. H. STALL 3,025,782
BARBECUING VEHICLE
Filed Feb. 9, 1959 3 Sheets-Sheet 3
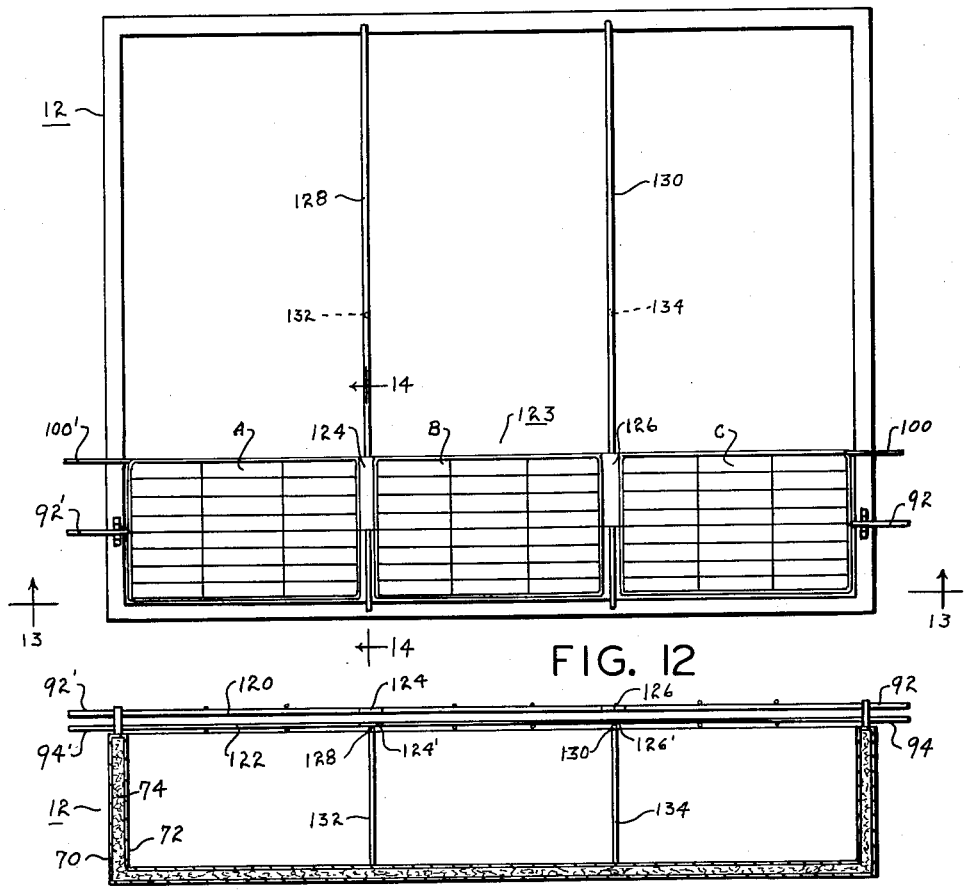
FIG. 12
FIG. 13
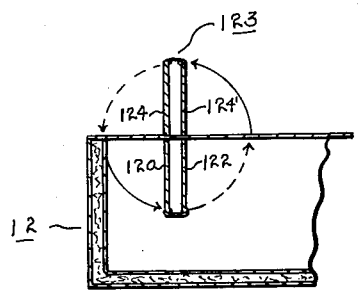
FIG. 14
INVENTOR.
JAMES H. STALL
BY
M. A. Hobbs
ATTORNEY United States Patent Office 3,025,782
Patented Mar. 20, 1962

3,025,782
BARBECUING VEHICLE
James H. Stall, Box 282, Goshen, Ind.
Filed Feb. 9, 1959, Ser. No. 791,961
9 Claims. (Cl. 99—339)

The present invention relates to a vehicle for preparing food, and more particularly to an apparatus for barbecuing or broiling meat.

One of the principal objects of the present invention is to provide a barbecuing apparatus which can be prepared for operation at a convenient location and easily moved considerable distances to another location where it is to be used, and thereafter moved from place to place without interrupting the operation of the apparatus.

Another object of the present invention is to provide a mobile barbecuing apparatus which can be moved from place to place without being disassembled and then reassembled, and which can be moved while the fire is burning.

Still another object of the invention is to provide an efficient large capacity barbecuing apparatus which can be used for preparing meat for serving various sized groups at one time and in one operation.

A further object of the invention is to provide a large barbecuing apparatus which can be placed in any convenient position and location for operating the apparatus and serving the meat prepared thereon.

Another object is to provide a grill for the foregoing type of barbecuing apparatus, which can readily be rotated from one side to the other and which will stay in the desired position without locking or latching and can be easily removed from and placed on the apparatus.

Another object of the present invention is to provide a portable barbecuing apparatus which can be used on a lawn or other area easily harmed by heat without causing any damage thereto and which can be moved into place for preparing and serving meat, and thereafter promptly removed.

Additional objects and advantages will become apparent from the following description and accompanying drawings, wherein:

FIGURE 1 is a side elevational view of my barbecuing apparatus;

FIGURE 2 is a top plan view of the barbecuing apparatus;

FIGURE 3 is a front end view of the apparatus shown in FIGURES 1 and 2;

FIGURE 11 is a vertical cross sectional view of an adjustment means for the apparatus, taken on line 11—11 of FIGURE 1;

FIGURE 12 is a top plan view of a modified form of my invention; and

Figure 4:
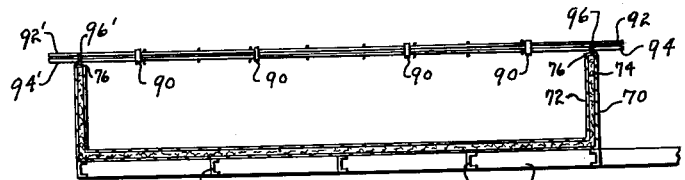
FIGURE 4 is a vertical cross sectional view of my barbecuing apparatus taken on line 4—4 of FIGURE 2.

FIGURES 13 and 14 are sectional views taken on lines 13—13 and 14—14, respectively, of FIGURE 12.

Referring more specifically to the drawings, numeral 12 designates a fire pit, 14 a frame for supporting the pit, and 16, 18, 20 and 22 grills mounted above and supported by fire pit 12. The frame 14 is mounted on a running gear consisting of an axle 24 connected to the underside of frame 14 by spring assemblies 26 and 28 and supporting wheels 30 and 32, said wheels having pneumatic tires 34 and 36, respectively, mounted thereon. The particular type and construction of the running gear used in the present barbecuing apparatus is not important and any other standard or conventional running gear or parts thereof can be substituted for the one shown. The front end of the frame is provided with an extension 38 rigidly connected to the frame and consisting of side members 40 and 42 joined at one end to the frame and terminating at the other end in a coupling member 44 which, for the purpose of the present description, can be any conventional coupling used in connecting the apparatus to the rear of an automobile or truck. A plate 46 is preferably placed over and secured to members 40 and 42 forming a rigid structurre for pulling the apparatus and for supporting firmly a parking wheel 48 and its supporting adjustment mechanism 50 which is welded to the plate at point 52. The plate is also used as a utility table while the barbecuing apparatus is in operation.

The parking wheel adjustment mechanism consists of a vertically disposed cylindrical housing 54 secured at its bottom to plate 46 and a cylindrical leg 56 adapted to telescope into the housing from the bottom and rotatably supporting wheel 48 on shaft 58 in the bifurcated lower end. Leg 56 is adjusted between traveling position and parking position, i.e. between its raised and lowered positions by a screw 60 threadedly received in a collar 62 secured in the upper end of the stem. The screw extends through a cap 64 on the upper end of housing 54 and is rotated by a handle 66 secured to the upper end of the screw and held in place along with the screw by a collar 68 beneath cap 64.

Fire pit 12 is secured to frame 14 and consists of a steel outer shell 70 of rectangular shape, a steel inner shell 72 spaced from the outer shell, and a layer of insulating material 74 disposed between the two shells, both along the bottom and on the four sides. A flange 76 formed integrally with the upper edges of the inner shell extends across the space between the shells and rests on the upper edge of the outer shell, thus closing the upper part of the intervening space and supporting the inner shell above the bottom of the outer shell. The bottom of the inner shell which is in contact with the coals in the pit may be reinforced and supported in part by a series of spaced members between the bottoms of the shells, and/or the bottom of the inner shell may be corrugated or otherwise ribbed to give it added strength to resist the effect of the heat from the coals. A series of cross members 78 of the frame gives support to the underside of the pit as well as additional strength to the frame.

One of the important features of the present invention is the design and contruction of the grills, in that they permit efficient and effective use of a large fire pit. The unit disclosed in the drawings contains four grills 16, 18, 20 and 22 identical in construction and operation and covering substantially all of the open top of the pit. Each grill consists of two sections 80 and 82 of spaced and longitudinally arranged rods 84 held firmly in place by a plurality of cross members 86 and end members 88 welded or otherwise secured to the rods. The two sections are pivotally connected to each other along one side by a plurality of hinges 90 consisting of a strap portion with an eye at each end for receiving the side rods of each section. These hinges permit the sections to close in the manner shown in FIGURE 6 and to open fully in the manner shown in FIGURE 7 and will permit the sections to adjust themselves within limits to various thicknesses or loads of meat.

Each grill is rotatably supported by the ends of the pit above the fire by stems 92 and 92', and 94 and 94' on sections 80 and 82, respectively, positioned in segmented rings 96 and 96' at the end of the grills, said ring segments being rigidly secured to the upper surface of the fire pit ends by welding or any other suitable securing means which will leave the inner surface of the ring smooth and unobstructed for easy gliding of the two stems thereon. Space is provided at the top of the rings to permit the stems to be inserted in and removed from the rings. Stem-like handles 100 and 100', and 102 and 102' are secured to the opposite ends of the respective sections on the side opposite the hinges to facilitate turning the grills from side to side and opening and closing the grills by lifting one or the other section. These handles have the further purpose of resting on the upper edge of the ends of the pit and holding the grills in place to prevent them from accidentally turning after they have been turned from one side to the other. Also the handles, together with the stems, are used by the operator in lifting the grills from the pit and lowering them in place on the pit. A suitable latch 106, preferably several, is used along the side of the grills opposite the hinges to hold the grill in closed condition after the meat has been placed in the grill for cooking. A disposable wire hook may be used for the latch if desired.

Figure 5:
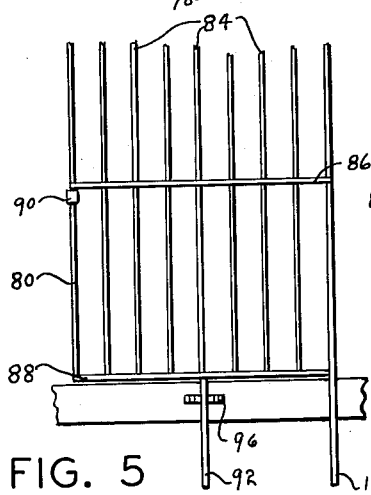
FIGURE 5 is a fragmentary top plan view of my grill showing it in the position assumed while it is being used to barbecue meat.
Figure 6:
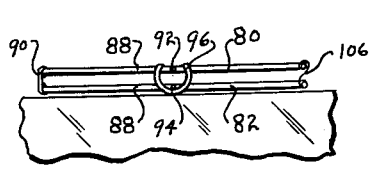
FIGURE 6 is an end elevational view of the grill in FIGURE 5, showing it mounted on the barbecuing apparatus in operating position.
Figure 8:
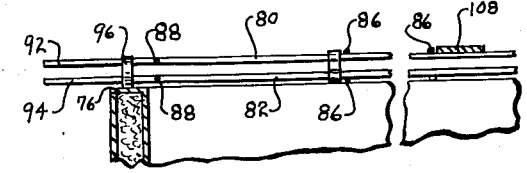
FIGURE 8 is a fragmentary vertical cross sectional view of the grill and a portion of the fire pit, taken on line 8—8 of FIGURE 2.
Figure 9:
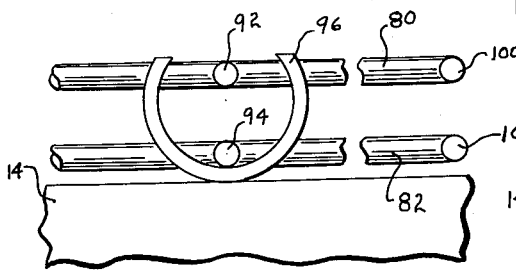
FIGURE 9 is an enlarged fragmentary end elevational view of the grill and support therefor showing the grill in the position assumed while the meat therein is being heated on one side.
Figure 10:
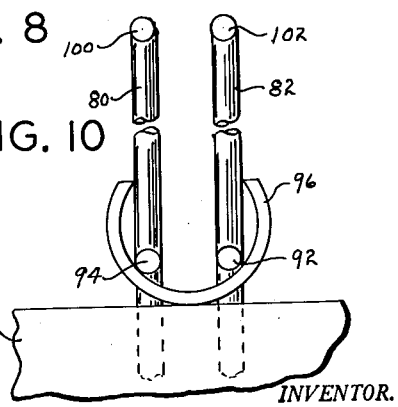
FIGURE 10 is an enlarged fragmentary end elevational view of the grill and support therefor showing the manner in which the grill is rotated from one side to the other.

Stems 92, 92' and 94, 94' are in the center of the ends of each grill section and, since it is preferable that the grills remain in their horizontal position, as shown in FIGURES 5 and 6, after they have been rotated from one side to the other, the open side of the grill, i.e. the side on which handles 100 and 102 are disposed, is weighted by one or more members 108 of iron or other heavy fire-resistant material secured to the grill rods 84 and/or cross members 86. These weights hold the handles down firmly on the upper edge of the fire pit ends and prevent the grills from accidentally rotating.

Since it is sometimes necessary to hold the food after it has been prepared in the grills, steam table 110 consisting of a steel plate is preferably provided over a portion of the fire pit such as that shown in FIGURES 1 and 3. The meat cooking in the grills can be placed directly on the hot table or in pans or the like sitting on the table. The table also gives the operator a work area for use in preparing the meat for cooking.

In the operation of the present barbecuing apparatus, a fire is prepared in the pit, preferably of charcoal. This may be laid and possibly started at one location and the apparatus moved to the place where the meat will be served by hitching the apparatus behind an automobile or truck and pulling it to the desired location and maneuvering it into position for cooking and serving. As an alternative, the fuel, accessories and culinary implements may be hauled in the apparatus to the desired location and the fire laid and started, the apparatus being used as a vehicle for transporting the necessary equipment and some of the food and ingredients for preparing the food.

Figure 7:
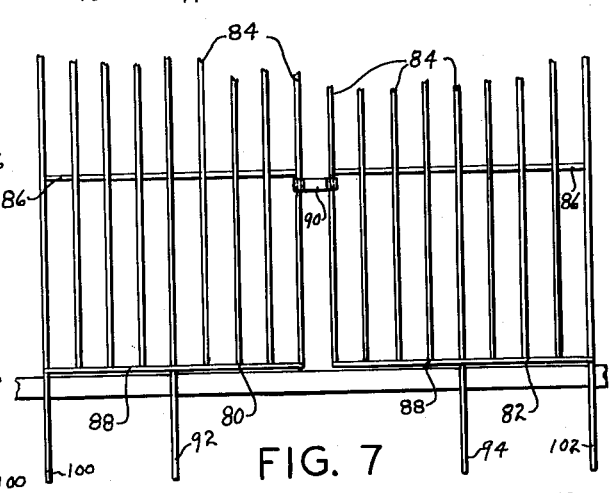
FIGURE 7 is a fragmentary top plan view of the grill showing it in the position assumed while it is being loaded and unloaded.

In filling the grills with meat, such as parts of chicken and the like, the grills are preferably removed from the apparatus, placed on a suitable support and opened to the position shown in FIGURE 7. The meat is placed on one of the sections, the other section is lifted over and laid on the meat, and the two sections are latched with a wire hook or the like to hold them firmly together. The grill filled with meat is lifted over the pit and stems 92, 92' and 94, 94' are placed in rings 96 and 96' and handles 100, 100' and 102, 102' are placed on the upper edge of the pit ends. When one side of the meat is partially or fully browned, the grill is rotated to the other side by lifting the handles and permitting stems 92, 92' and 94, 94' to rotate in rings 96 and 96', lowering the handles to the opposite sides of the rings and placing them again on the upper edge of the pit ends. The individual grills may be turned from side to side as often as necessary to properly cook the meat. After the meat has been cooked, the grill is lifted from the pit by an operator at each end, lifting the stem from the respective rings and placing the grill on a support for opening.

It is seen that the present barbecuing apparatus can be easily placed in operation and operated to its maximum efficiency at one location and readily moved to another location for cleaning and preparing for further operations. While the apparatus is large for a portable unit, it is compact and easily handled, both in moving it from place to place and in barbecuing and serving meat at the desired location. One or more of the grills can be used in any particular operation by placing the fire longitudinally along a portion of the fire pit.

In the modified form shown in FIGURES 12, 13 and 14 the two sections 120 and 122 of the grill 123 are formed of three parts A, B and C joined together by weights 124 and 126 by welding, only one of several grills being shown. The structure is otherwise substantially the same as the grill previously described, including the stems, handles and supporting rings therefor, the same numerals being given to these parts as those used in the previous figures. In this modification, weights 124 and 126 extend inwardly to the center of the section and are supported by horizontal rods 128 and 130 extending across the pit and supported on opposite sides thereof which may also be reinforced by legs 132 and 134. These rods provide support of the grills between their ends, both while the grills are in one of the other horizontal positions and during the turning operation. When the grills are in their horizontal position, the lower section is supported as shown in FIGURE 13 and while the grills are being rotated, the inner ends of the weights rest on rods 128 and 130, thus giving support throughout the turning operation. The full arcs with an arrow indicate the position from which the grill has been rotated and the broken arcs indicate the position to which the grill will be rotated. In this, as in the previous embodiment disclosed herein, a larger or smaller number of grills can be used and the pit varied in size accordingly.

Although only one embodiment of the present invention has been described in detail herein, various modifications and changes can be made without departing from the scope of the invention. For example, various sized units can be made, either with additional or fewer grills or with grills of different lengths and widths. Further, the steel plate forming the steam table may if desired be replaced by pans extending downwardly below the upper edge of the fire pit.

I claim:

1. A barbecuing vehicle, comprising a horizontal frame, a fire pit mounted on said frame and having side and end walls and bottom forming an outer shell, side and end walls and bottom forming an inner shell spaced from said outer shell, said outer shell fully enclosing said inner shell except at the top, insulating material between said shells, an axle disposed beneath and supporting said frame, spring means connecting said axle to said frame, wheels on the ends of said axle, four grills mounted side by side in close proximity above said fire pit, each of said grills consisting of two sections having opposed end members and a plurality of parallel rods arranged lengthwise of said grill, cross members joined rigidly to said rods, a stem rigidly attached to each end member of said sections at the center thereof and extending outwardly therefrom parallel with the side of the grill, a handle rigidly attached to the end member of each section near one side of the section and extending beyond the end thereof, a plurality of hinges pivotally connecting the two sections along the side opposite said handles to permit the grill to move between open and close positions, latch means for holding said sections in closed position, weight means secured to each section on the side opposite said hinges, rings with an opening at the top secured to the top of the end walls for receiving said stems when the grill is in closed position, a metal plate forming a steam table above the fire pit along one side, a member secured to said frame for pulling said vehicle, a parking wheel attached to said last mentioned member, and a means for raising and lowering said parking wheel.

2. A barbecuing vehicle, comprising a horizontal frame, a first pit mounted on said frame and having side and end walls and bottom forming an outer shell, side and end walls and bottom forming an inner shell spaced from said outer shell, said outer shell fully enclosing said inner shell except at the top, insulating material between said shells, wheels for said vehicle, mechanism for supporting said frame on said wheels, a plurality of grills mounted side by side in close proximity above said fire pit, each of said grills consisting of two sections having opposed end members and a plurality of parallel rods arranged lengthwise of said grill, cross members joined rigidly to said rods, a stem rigidly attached to each end member of said sections at the center thereof and extending outwardly therefrom parallel with the sides of the grill, a handle rigidily attached to the end members of each section near one side of the section and extending beyond the end thereof, a hinge means pivotally connecting the two sections along the side opposite said handles to permit the grill to move between open and closed position, latch means for holding said sections in closed position, weight means secured to each section on the side opposite said hinge means, ring means with an opening at the top secured to the top of the end walls for receiving said stems when the grill is in closed position, and a member secured to said frame for maneuvering said vehicle.

3. A barbecuing vehicle, comprising a fire pit having side and end walls and bottom forming an outer shell, side and end walls and bottom forming an inner shell spaced from said outer shell, said outer shell fully enclosing said inner shell except at the top, insulating material between said shells, running gear including a pair of wheels for supporting said pit, a plurality of grills mounted side by side in close proximity above said fire pit, each of said grills consisting of two sections having opposed end members and a plurality of parallel rods arranged lengthwise of said grill, cross members joined rigidly to said rods, a stem rigidly attached to each end member of said sections at the center thereof and extending outwardly therefrom parallel with the sides of the grill, a handle attached to the end members of each section near one side of the section and extending beyond the end thereof, a hinge means pivotally connecting the two sections along the side opposite said handles to permit the grill to move between open and closed position, latch means for holding said sections in closed position, weight means secured to each section on the side opposite said hinge means, and ring means with an opening at the top secured to the top of the end walls for receiving said stems when the grill is in closed position.

4. A barbecuing vehicle, comprising a fire pit having insulated end and side walls and a bottom and having an opening only at the top, running gear including a pair of wheels for supporting said pit, a plurality of grills mounted side by side above said fire pit, each of said grills consisting of two sections having opposed end members, a stem rigidly attached to each end member of said sections at the center thereof and extending outwardly therefrom parallel with the side of the grill, a handle attached to the end members of each section near one side of the section and extending beyond the end thereof, a hinge means pivotally connecting the two sections along the side opposite said handles to permit the grill to move between open and closed position, weight means secured to each section on the side opposite said hinge means, and a means secured to the top of the end walls for receiving said stems when the grill is in closed position.

5. A barbecuing vehicle, comprising side and end walls and bottom forming a fire pit and having an opening only at the top, running gear including a pair of wheels for supporting said pit, a grill, said grill consisting of two sections having opposed end members, a stem rigidly attached to each end member of said sections near the center thereof and extending outwardly therefrom parallel with the sides of the grill, a handle attached to the end members of each section near one side of the section and extending beyond the end thereof, a hinge means pivotally connecting the two sections along the side opposite said handles to permit the grill to move between open and closed position, and means secured to the top of the end walls for receiving said stems when the grill is in closed position.

6. In a barbecuing vehicle: side and end walls and bottom forming a fire pit, a grill, said grill consisting of two sections having opposed end members, a stem rigidly attached to each end member of said sections at the center thereof and extending outwardly therefrom parallel with the sides of the grill, a handle attached to the end members of each section near one side of the section and extending beyond the end thereof, a hinge means pivotally connecting the two sections along the side opposite said handles to permit the grill to move between open and closed position, weight means secured to each section on the side opposite said hinge means, and means secured to the top of the end walls for receiving said stems when the grill is in closed position.

7. In a barbecuing vehicle: side and end walls and bottom forming a fire pit, a grill, said grill consisting of two sections having opposed end members and a plurality of spaced and aligned parts, a stem rigidly attached to each end member of said sections at the center thereof and extending outwardly therefrom parallel with the sides of the grill, a handle attached to the end members of each section near one side of the section and extending beyond the end thereof, a hinge means pivotally connecting the two sections along the side opposite said handles to permit the grill to move between open and closed position, weight means secured to each section on the side opposite said hinge means of each section and being secured between said parts, and means secured to the top of the end walls for receiving said stems when the grill is in closed position.

8. A grill construction for a barbecuing apparatus, comprising two sections having opposed end members and a plurality of parallel rods arranged lengthwise of said grill, cross members joined rigidly to said rods, a stem rigidly attached to each end member of said sections at the center thereof and extending outwardly therefrom parallel with the sides of the grill, a handle attached to the end members of each section near one side of the section and extending beyond the end thereof, a plurality of hinges pivotally connecting the two sections along the side opposite said handles to permit the grill to move between open and closed position, latch means for holding said sections in closed position, weight means secured to each section on the side opposite said hinge means, and a ring means with an opening at the top for receiving and supporting said stems when the grill is in closed position.

9. A grill construction for a barbecuing apparatus, comprising two sections having opposed end members, a stem rigidly attached to each end member of said sections at the center thereof and extending outwardly therefrom parallel with the sides of the grill, a handle attached to the end members of each section near one side of the section and extending beyond the end thereof, a hinge means pivotally connecting the two sections along the side opposite said handles to permit the grill to move between open and closed position, weight means secured to each section on the side opposite said hinge means, and means for receiving and supporting said stems when the grill is in closed position.

References Cited in the file of this patent

UNITED STATES PATENTS

| | | |
|---|---|---|
| 752,497 | Wilson | Feb. 16, 1904 |
| 852,624 | Rugg | May 7, 1907 |
| 1,517,795 | Morrison et al. | Dec. 2, 1924 |
| 1,879,010 | Antrim | Sept. 27, 1932 |
| 2,330,132 | Martin | Sept. 21, 1943 |
| 2,493,258 | Massacre | Jan. 3, 1950 |
| 2,575,082 | Wolff | Nov. 13, 1951 |
| 2,614,483 | Scofield | Oct. 21, 1952 |
| 2,771,318 | Jagsch | Nov. 20, 1956 |
| 2,780,474 | Farah et al. | Feb. 5, 1957 |
| 2,826,981 | Chick | Mar. 18, 1958 |
| 2,867,208 | True | Jan. 6, 1959 |

FOREIGN PATENTS

| | | |
|---|---|---|
| 586,577 | France | Jan. 7, 1925 |
| 331,164 | Italy | Oct. 30, 1935 |